(12) United States Patent
Baek et al.

(10) Patent No.: US 7,668,074 B2
(45) Date of Patent: Feb. 23, 2010

(54) HOME NETWORK SYSTEM (75) Inventors: Seung-Myun Baek, Changwon-shi (KR); Koon Seok Lee, Changwon-shi (KR); Yong-Tae Kim, Gimhae-shi (KR)

(73) Assignee: LG Electronics Inc., Seoul (KR)

( * ) Notice: Subject to any disclaimer, the term of this patent is extended or adjusted under 35 U.S.C. 154(b) by 207 days.

(21) Appl. No.: 11/547,359

(22) PCT Filed: Mar. 31, 2005

(86) PCT No.: PCT/KR2005/000946

§ 371 (c)(1),
(2), (4) Date: Sep. 17, 2007

(87) PCT Pub. No.: WO2005/094192

PCT Pub. Date: Oct. 13, 2005

(65) Prior Publication Data

US 2008/0095035 A1  Apr. 24, 2008

(30) Foreign Application Priority Data

Mar. 31, 2004 (KR) .................. 10-2004-0022201

(51) Int. Cl.
H04J 11/00 (2006.01)
H04L 12/413 (2006.01)
H04J 3/16 (2006.01)
H04J 3/22 (2006.01)

(52) U.S. Cl. .................. 370/203; 370/445; 370/469

(58) Field of Classification Search .................. None
See application file for complete search history.

(56) References Cited

U.S. PATENT DOCUMENTS 5,268,666 A * 12/1993 Michel et al. .......... 340/310.16
5,452,291 A * 9/1995 Eisenhandler et al. ....... 370/402
6,100,817 A * 8/2000 Mason et al. .......... 340/870.02
6,904,466 B1 * 6/2005 Ishiyama et al. ............ 709/245
2003/0055922 A1 * 3/2003 Kim et al. .................. 709/220
2004/0120295 A1 * 6/2004 Liu et al. .................... 370/338

FOREIGN PATENT DOCUMENTS

| EP | 0909074 A1 | 4/1999 |
| WO | WO 97/00471 | 1/1997 |
| WO | WO 02/097555 | 12/2002 |

* cited by examiner

Primary Examiner—Chi H Pham
Assistant Examiner—Farah Faroul
(74) Attorney, Agent, or Firm—McKenna Long & Aldridge LLP (57) ABSTRACT The present invention discloses a home network system (1) using a living network control protocol. The home network system (1) includes: a predetermined network; at least one electric device (40 to 49) connected to the network based on a predetermined protocol; and at least one network manager (2 to 23) connected to the network based on the protocol, for controlling and monitoring the electric device (40 to 49), wherein the protocol comprises an application layer, a network layer, a data link layer, and a physical layer, wherein the physical layer further comprises a special protocol for providing an interface with a dependent transmission medium, and the network layer further comprises a home code control sub-layer for managing a home code for network security when accessing the dependent transmission medium, the home control sub-layer processing a packet from the data link layer or the network layer, according to a predetermined home code.

12 Claims, 7 Drawing Sheets

HOME NETWORK SYSTEM

This application claims the benefit of Korean Patent Application No. 2004-0022201, filed on Mar. 31, 2004 and PCT Application No. PCT/KR2005/000946, filed on Mar. 31, 2005, which are hereby incorporated by reference for all purposes as if fully set forth herein.

TECHNICAL FIELD

The present invention relates to a home network system, and more particularly to, a home network system using a living network control protocol.

BACKGROUND ART

A home network connects various digital home appliances so that the user can always enjoy convenient, safe and economic life services inside or outside the house. Refrigerators or washing machines called white home appliances have been gradually digitalized due to the development of digital signal processing techniques, home appliance operating system techniques and high speed multimedia communication techniques have been integrated on the digital home appliances, and new information home appliances have been developed, to improve the home network.

As shown in Table 1, the home network is classified into a data network, an entertainment network and a living network by types of services.

TABLE 1

| Classification | Function | Service type |
| --- | --- | --- |
| Data network | Network between PC and peripheral devices | Data exchange, internet service, etc. |
| Entertainment network | Network between A/V devices | Music, animation service, etc. |
| Living network | Network for controlling home appliances | Home appliances control, home automation, remote meter reading, message service, etc. |

Here, the data network is built to exchange data between a PC and peripheral devices or provide an internet service, and the entertainment network is built between home appliances using audio or video information. In addition, the living network is built to simply control home appliances, such as home automation or remote meter reading.

A conventional home network system includes a master device which is an electric device for controlling an operation of the other electric devices or monitoring a status thereof, and a slave device which is an electric device having a function of responding to the request of the master device and a function of notifying a status change according to characteristics of the electric devices or other factors. Exemplary electric devices include home appliances for the living network service such as a washing machine and a refrigerator, home appliances for the data network service and the entertainment network service, and products such as a gas valve control device, an automatic door device and an electric lamp.

However, the conventional arts do not suggest a general communication standard for providing functions of controlling and monitoring electric devices in a home network system. Also, a network protocol in the conventional art home network system does not suggest an effective method for receiving and transmitting a packet.

DISCLOSURE OF THE INVENTION

The present invention is achieved to solve the above problems. An object of the present invention is to provide a home network system using a control protocol which is a general communication standard for providing functions of controlling and monitoring electric devices in the home network system.

Another object of the present invention is to provide a home network system using a living network control protocol (LnCP) as a general communication standard.

Still another object of the present invention is to provide a general communication standard for a home network system including networks using different transmission media and/or different dependent transmission media, and a home network system using the communication standard.

Still another object of the present invention is to provide a home network system for transmitting/receiving and processing a packet using a home code for network security.

Yet another object of the present invention is to provide a home network system for transmitting/receiving and processing a received packet according to a network layer packet type of the received packet.

In order to achieve the above-described objects of the invention, there is provided a home network system including: a predetermined network; at least one electric device connected to the network based on a predetermined protocol; and at least one network manager connected to the network based on the protocol, for controlling and monitoring the electric device, wherein the protocol includes an application layer, a network layer, a data link layer, and a physical layer, wherein the physical layer further includes a special protocol for providing an interface with a dependent transmission medium, and the network layer further includes a home code control sub-layer for managing a home code for network security when accessing the dependent transmission medium, the home control sub-layer processing a packet from the data link layer or the network layer, according to a predetermined home code.

BEST MODE FOR CARRYING OUT THE INVENTION

A home network system in accordance with the present invention will now be described in detail with reference to the accompanying drawings.

Figure 1:
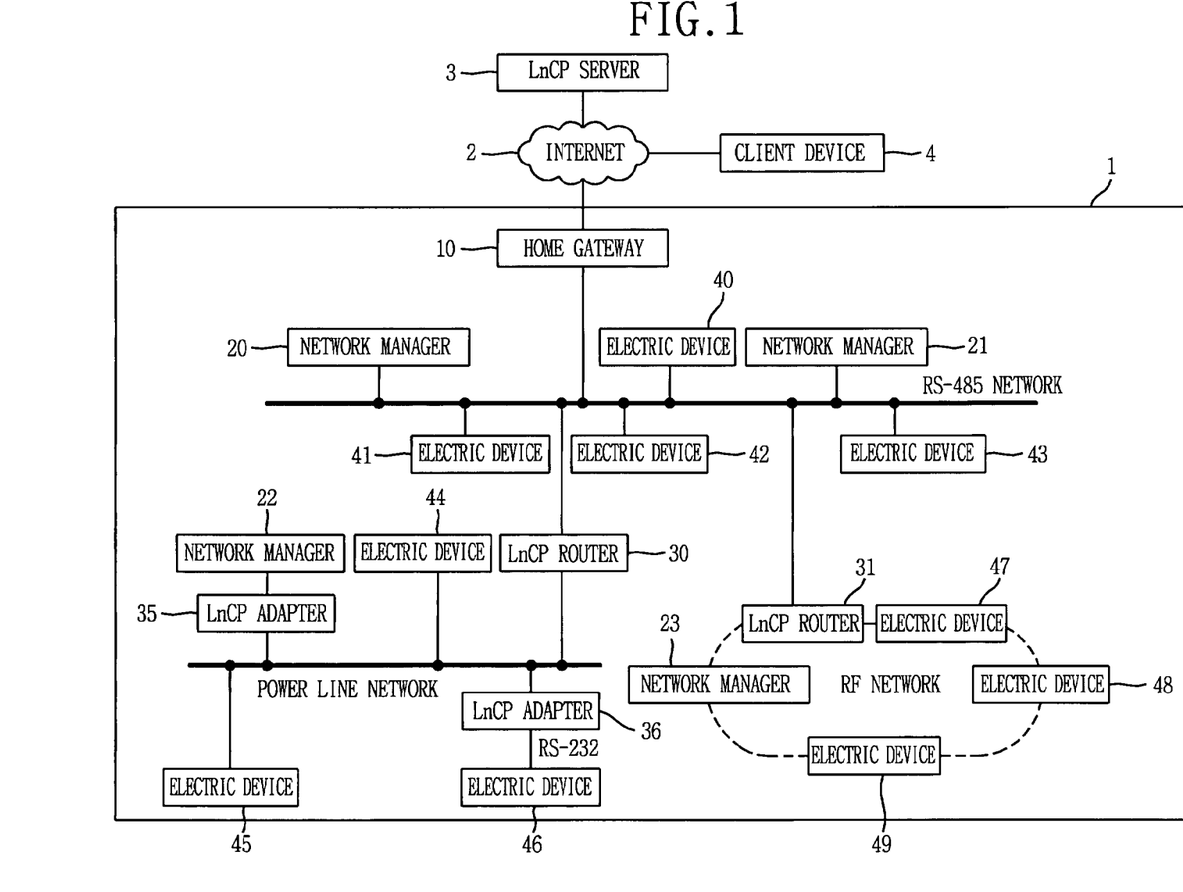
FIG. 1 is a structure view illustrating a home network system in accordance with the present invention.

FIG. 1 is a structure view illustrating the home network system in accordance with the present invention.

Referring to FIG. 1, the home network system 1 accesses an LnCP server 3 through an internet 2, and a client device 4 accesses the LnCP server 3 through the internet 2. That is, the home network system 1 is connected to communicate with the LnCP server 3 and/or the client device 4.

An external network of the home network system 1 such as the internet 2 includes additional constitutional elements according to a kind of the client device 4. For example, when the client device 4 is a computer, the internet 2 includes a Web server (not shown), and when the client device 4 is an internet phone, the internet 2 includes a Wap server (not shown).

The LnCP server 3 accesses the home network system 1 and the client device 4 according to predetermined login and logout procedures, respectively, receives monitoring and control commands from the client device 4, and transmits the commands to the network system 1 through the internet 2 in the form of predetermined types of messages. In addition, the LnCP server 3 receives a predetermined type of message from the home network system 1, and stores the message and/or transmits the message to the client device 4. The LnCP server 3 also stores or generates a message, and transmits the message to the home network system 1. That is, the home network system 1 accesses the LnCP server 3 and downloads provided contents.

The home network system 1 includes a home gateway 10 for performing an access function to the internet 2, network managers 20 to 23 for performing a function of setting an environment and managing electric devices 40 to 49, LnCP routers 30 and 31 for access between transmission media, LnCP adapters 35 and 36 for connecting the network manager 22 and the electric device 46 to the transmission medium, and the plurality of electric devices 40 to 49.

The network of the home network system 1 is formed by connecting the electric devices 40 to 49 through a shared transmission medium. A data link layer uses a non-standardized transmission medium such as RS-485 or small output RF, or a standardized transmission medium such as a power line and IEEE 802.11 as the transmission medium.

The network of the home network system 1 is separated from the internet 2, for composing an independent network for connecting the electric devices through wire or wireless transmission medium. Here, the independent network includes a physically-connected but logically-divided network.

The home network system 1 includes master devices for controlling operations of the other electric devices 40 to 49 or monitoring statuses thereof, and slave devices having functions of responding to the request of the master devices and notifying their status change information. The master devices include the network managers 20 to 23, and the slave devices include the electric devices 40 to 49. The network managers 20 to 23 include information of the controlled electric devices 40 to 49 and control codes, and control the electric devices 40 to 49 according to a programmed method or by receiving inputs from the LnCP server 3 and/or the client device 4. Still referring to FIG. 1, when the plurality of network managers 20 to 23 are connected, each of the network managers 20 to 23 must be both the master device and the slave device, namely physically one device but logically the device (hybrid device) for simultaneously performing master and slave functions in order to perform information exchange, data synchronization and control with the other network managers 20 to 23.

In addition, the network managers 20 to 23 and the electric devices 40 to 49 can be connected directly to the network (power line network, RS-485 network and RF network) or through the LnCP routers 30 and 31 and/or the LnCP adapters 35 and 36.

The electric devices 40 to 49 and/or the LnCP routers 30 and 31 and/or the LnCP adapters 35 and 36 are registered in the network managers 20 to 23, and provided with intrinsic logical addresses by products (for example, 0x00, 0x01, etc.). The logical addresses are combined with product codes (for example, 0x02 of air conditioner and 0x01 of washing machine), and used as node addresses. For example, the electric devices 40 to 49 and/or the LnCP routers 30 and 31 and/or the LnCP adapters 35 and 36 are identified by the node addresses such as 0x0200 (air conditioner 1) and 0x0201 (air conditioner 2). A group address for identifying at least one electric device 40 to 49 and/or at least one LnCP router 30 and 31 and/or at least one LnCP adapter 35 and 36 at a time can be used according to a predetermined standard (all identical products, installation space of products, user, etc.). In the group address, an explicit group address is a cluster for designating a plurality of devices by setting an address option value (flag mentioned below) as 1, and an implicit group address designates a plurality of devices by filling the whole bit values of the logical addresses and/or the product codes with 1. Especially, the implicit group address is called a cluster code.

Figure 2:
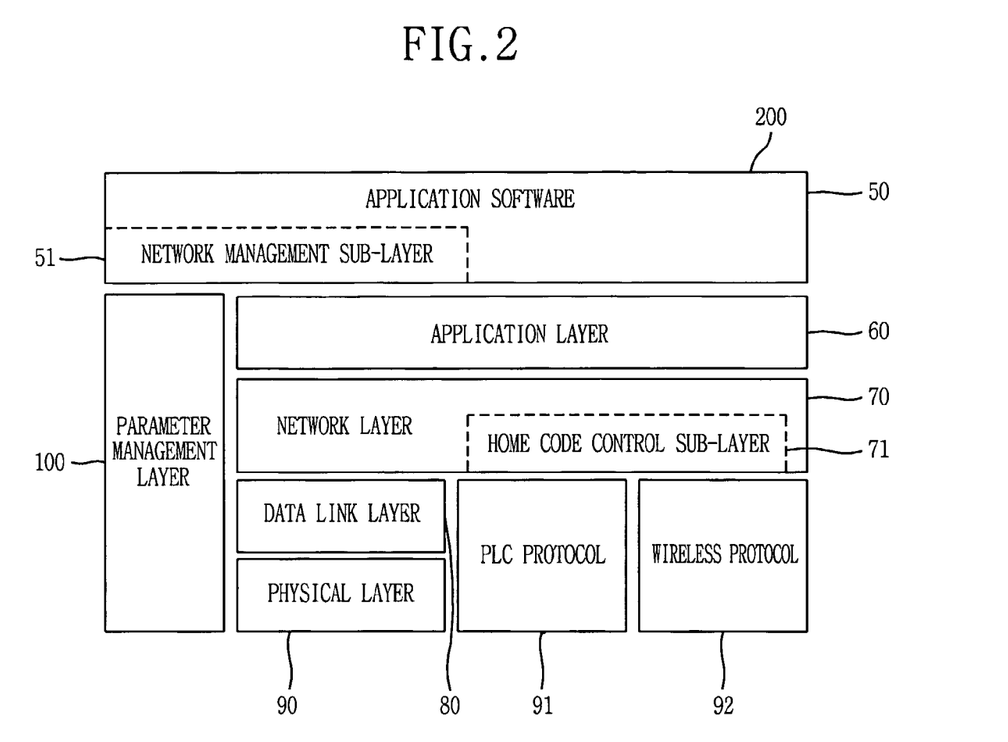
FIG. 2 is a structure view illustrating a living network control protocol stack in accordance with the present invention.

FIG. 2 is a structure view illustrating a living network control protocol stack in accordance with the present invention. The home network system 1 enables the network managers 20 to 23, the LnCP routers 30 and 31, the LnCP adapters 35 and 36 and the electric devices 40 to 49 to communicate with each other according to the living network control protocol (LnCP) of FIG. 2. Therefore, the network managers 20 to 23, the LnCP routers 30 and 31, the LnCP adapters 35 and 36 and the electric devices 40 to 49 perform network communication according to the LnCP.

As illustrated in FIG. 2, the LnCP includes an application software 50 for performing intrinsic functions of the network managers 20 to 23, the LnCP routers 30 and 31, the LnCP adapters 35 and 36 and the electric devices 40 to 49, and providing an interface function with an application layer 60 for remote controlling and monitoring on the network, the application layer 60 for providing services to the user, and also providing a function of forming information or a command from the user in the form of a message and transmitting the message to the lower layer, a network layer 70 for reliably network-connecting the network managers 20 to 23, the LnCP routers 30 and 31, the LnCP adapters 35 and 36 and the electric devices 40 to 49, a data link layer 80 for providing a medium access control function of accessing a shared transmission medium, a physical layer 90 for providing physical interfaces between the network managers 20 to 23, the LnCP routers 30 and 31, the LnCP adapters 35 and 36 and the electric devices 40 to 49, and rules for transmitted bits, and a parameter management layer 100 for setting and managing node parameters used in each layer.

In detail, the application software 50 further includes a network management sub-layer 51 for managing the node parameters, and the network managers 20 to 23, the LnCP routers 30 and 31, the LnCP adapters 35 and 36 and the electric devices 40 to 49 which access the network. That is, the network management sub-layer 51 performs a parameter management function of setting or using the node parameter values through the parameter management layer 100, and a network management function of composing or managing the network when the device using the LnCP is a master device.

When the network which the network managers 20 to 23, the LnCP routers 30 and 31, the LnCP adapters 35 and 36 and the electric devices 40 to 49 access is a dependent transmission medium such as a power line, IEEE 802.11 and wireless (for example, when the LnCP includes a PLC protocol and/or wireless protocol), the network layer 70 further includes a home code control sub-layer 71 for performing a function of setting, managing and processing home codes for logically dividing each individual network. When the individual networks are physically divided by an independent transmission medium such as RS485, the home code control sub-layer 71 is not included in the LnCP. Each of the home codes is comprised of 4 bytes, and set as random values or designated values of the user.

Figure 3:
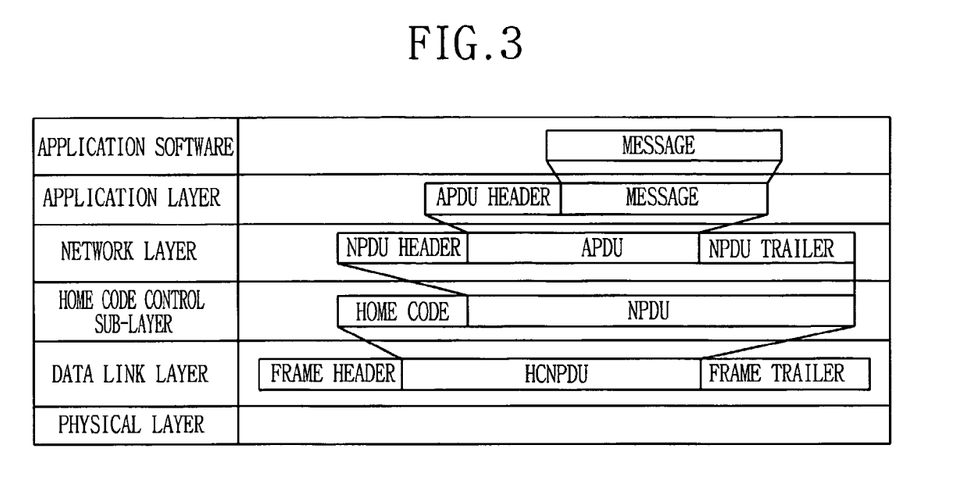
FIGS. 3 and 4 are structure views illustrating interfaces between layers of FIG. 2, respectively.
Figure 4:
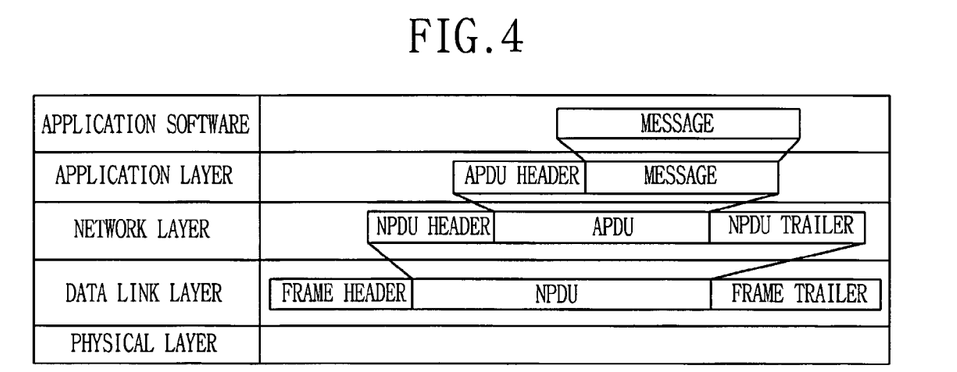

FIGS. 3 and 4 are structure views illustrating interfaces between the layers of FIG. 2, respectively.

FIG. 3 illustrates the interfaces between the layers when the physical layer 90 is connected to the non-independent transmission medium, and FIG. 4 illustrates the interfaces between the layers when the physical layer 90 is connected to the independent transmission medium.

The home network system 1 adds headers and trailers required by each layer to protocol data units (PDU) from the upper layers, and transmit them to the lower layers.

As shown in FIGS. 3 and 4, an application layer PDU (APDU) is a data transmitted between the application layer 60 and the network layer 70, a network layer PDU (NPDU) is a data transmitted between the network layer 70 and the data link layer 80 or the home code control sub-layer 71, and a home code control sub-layer PDU (HCNPDU) is a data transmitted between the network layer 70 (precisely, the home code control sub-layer 71) and the data link layer 80. The interface is formed in data frame units between the data link layer 80 and the physical layer 90.

FIGS. 5 to 10 are detailed structure views illustrating the interfaces of FIGS. 3 and 4, respectively.

Figure 5:
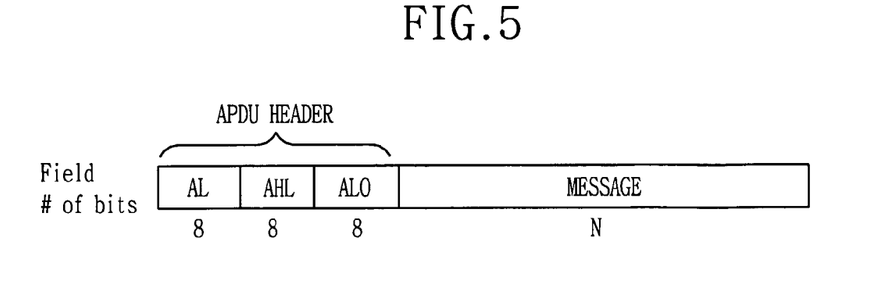
FIGS. 5 to 10 are detailed structure views illustrating the interfaces of FIGS. 3 and 4, respectively.

FIG. 5 illustrates the APDU structure in the application layer 60.

An APDU length (AL) field shows a length of the APDU (length from AL to message field), and has a minimum value of 4 and a maximum value of 77.

An APDU header length (AHL) field shows a length of an APDU header (length from AL to AL0), normally has 3 bytes, and is extensible to 7 bytes. In the LnCP, the APDU header can be extended to 7 bytes to encode a message field and change an application protocol.

An application layer option (ALO) field extends a message set. For example, when the ALO field is set as 0, if the ALO field contains a different value, message processing is ignored.

The message field processes a control message from the user or event information, and is changed by the value of the ALO field.

Figure 6:
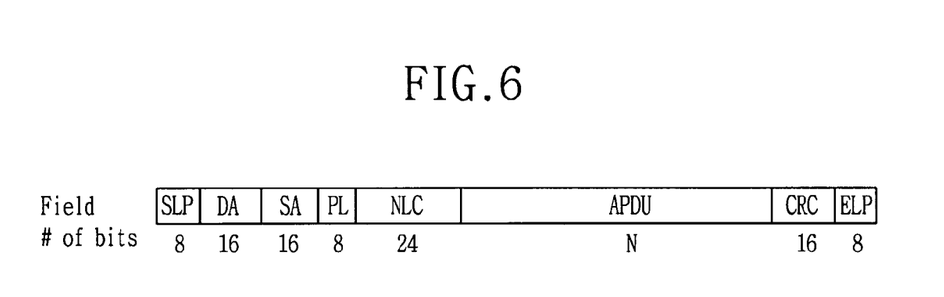
Figure 7:
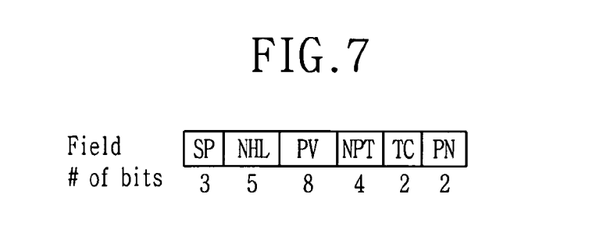

FIG. 6 illustrates the NPDU structure in the network layer 70, and FIG. 7 illustrates a detailed NLC structure of the NPDU.

A start of LnCP packet (SLP) field indicates start of a packet and has a value of 0x02.

Destination address (DA) and source address (SA) fields are node addresses of a receiver and a sender of a packet, and have 16 bits, respectively. The most significant 1 bit includes a flag indicating a group address, the succeeding 7 bits include a kind of a product (product code), and the lower 8 bits include a logical address for distinguishing the plurality of network managers 20 to 23 of the same kind and the plurality of electric devices 40 to 49 of the same kind. A packet length (PL) field shows the total length of NPDU which will be transferred, and its initial length is 15 bytes and its maximum length is 120 bytes.

A service priority (SP) field gives transmission priority to a transmission message and has 3 bits. Table 2 shows the priority of each transmission message.

When a slave device responds to a request of a master device, the slave device takes the priority of the request message from the master device.

TABLE 2

| Priority | Value | Message type |
|---|---|---|
| High | 0 | Security related message |
| Middle | 1 | When a normal packet is transmitted |
| | | When an event message for online or offline status change is transmitted |
| Normal | 2 | When a notification message for composing a network is transmitted |
| | | When a normal event message is transmitted |
| Low | 3 | When a data is transmitted by download or upload mechanism |

An NPDU header length (NHL) field extends an NPDU header (NLC field of SLP), normally has 9 bytes, and is extended to a maximum of 17 bytes.

A protocol version (PV) field indicates the employed protocol version and its length is 1 byte. The upper 4 bits show the version, and the lower 4 bits show the sub-version. Version and sub-version use HEX to show their values respectively.

A network layer packet type (NPT) field is a 4-bit field for distinguishing a kind of a packet in the network layer 70. The LnCP includes a request packet, a response packet and a notification packet. The NPT field of a master device must be set as the request packet or the notification packet, and the NPT field of a slave device must be set as the response packet or the notification packet. Table 3 shows NPT values by kinds of packets.

TABLE 3

| Explanation | Value |
|---|---|
| Request packet | 0 |
| reserved | 1~3 |
| Response packet | 4 |
| reserved | 5~7 |
| Notification packet | 8 |
| reserved | 9~12 |
| Reserved value for interface with the home code control sub-layer | 13~15 |

A transmission counter (TC) field is a 2 bit field which retransmits the request packet or repeatedly transfers notification packet in order to enhance the transmission success rate of the notification packet when a communication error occurs in the network layer 70, making it unable to transfer the request packet or response packet properly. Table 4 shows the range of the values of the TC field by the NPT values.

TABLE 4

| Kind of packet | Value (range) |
|---|---|
| Request packet | 1~3 |
| Response packet | 1 |
| Notification packet | 1~3 |

A packet number (PN) field consists of 2 bytes, and it is used with the TC to detect duplicated packets in the slave device, and it is used to deal with multiple communication cycles in the master device. Table 5 shows the range of the values of the PN field by the NPT values.

TABLE 5

| Kind of packet | Value (range) |
| --- | --- |
| Request packet | 0~3 |
| Response packet | Copy a PN field value of a request packet |
| Notification packet | 0~3 |

An APDU field is a protocol data unit of the application layer 60 transmitted between the application layer 60 and the network layer 70. The APDU field has a minimum value of 0 byte and a maximum value of 88 bytes.

A cyclic redundancy check (CRC) field is a 16-bit field for checking an error of a received packet (from SLP to APDU).

An end of LnCP packet (ELP) field is the end of the packet with the value 0x03. If the ELP field is not detected in spite of byte length of the received data is the same with the value of packet's length field, this packet will be considered as an error packet.

Figure 8:
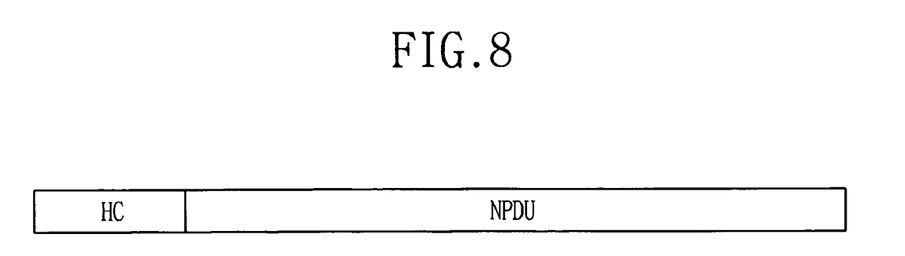

FIG. 8 illustrates the HCNPDU structure in the home code control sub-layer 71.

As depicted in FIG. 8, a home code (HC) field is added to the upper portion of the NPDU.

The home code is comprised of 4 bytes, and has a unique value within the line distance where a packet can be transmitted.

Figure 9:
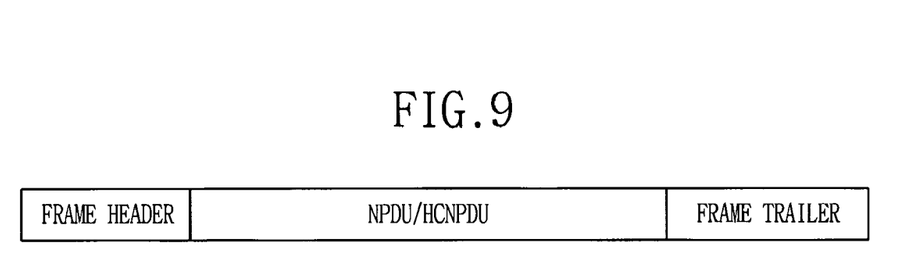

FIG. 9 illustrates a frame structure in the data link layer 80.

The structure of the header and the trailer of the data link layer frame of the LnCP is changed according to transmission media. When the data link layer 80 uses a non-standardized transmission medium, the header and the trailer of the frame must have null fields, and when the data link layer 80 uses a standardized transmission medium, the header and the trailer of the frame are formed as prescribed by the protocol. An NPDU field is a data unit transmitted from the upper network layer 70, and an HCNPDU field is a data unit obtained by adding 4 bytes of home code to the front portion of the NPDU, when the physical layer 90 is a dependent transmission medium such as a power line or IEEE 802.11. The data link layer 80 processes the NPDU and the HCNPDU in the same manner.

Figure 10:
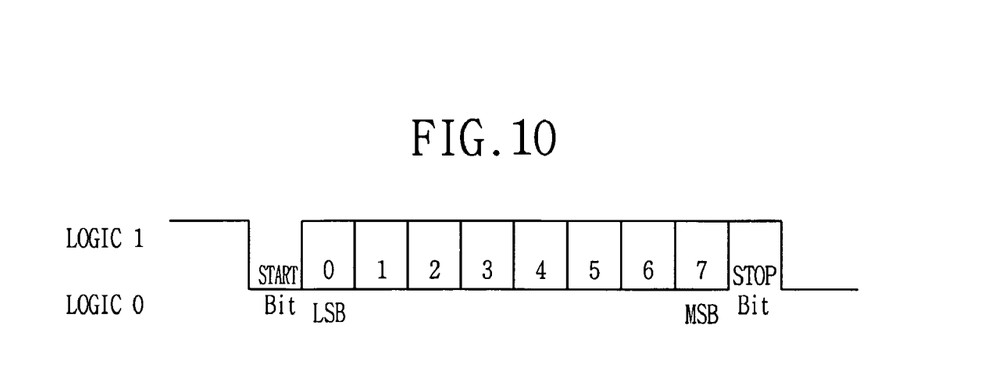

FIG. 10 illustrates a frame structure in the physical layer 90.

The physical layer 90 of the LnCP handles a function of transmitting and receiving a physical signal to a transmission medium. The data link layer 80 can use a non-standardized transmission medium such as RS-485 or small output RF or a standardized transmission medium such as a power line or IEEE. 802.11 as the physical layer 90 of the LnCP. The home network system 1 using the LnCP employs a universal asynchronous receiver and transmitter (UART) frame structure and a signal level of RS-232, so that the network managers 20 to 23 and the electric devices 40 to 49 can interface with RS-485, the LnCP routers 30 and 31 or the LnCP adapters 35 and 36. When the UART is connected between the devices by using a serial bus, the UART controls flow of bit signals on a communication line. In the LnCP, a packet from the upper layer is converted into 10 bits of UART frame unit as shown in FIG. 10, and transmitted through the transmission medium. The UART frame includes one bit of start bit, 8 bits of data and one bit of stop bit without any parity bit. The start bit is transmitted first, followed by data bits and the stop bit. When the home network system 1 using the LnCP employs the UART, it does not have additional frame header and frame trailer.

Figure 11:
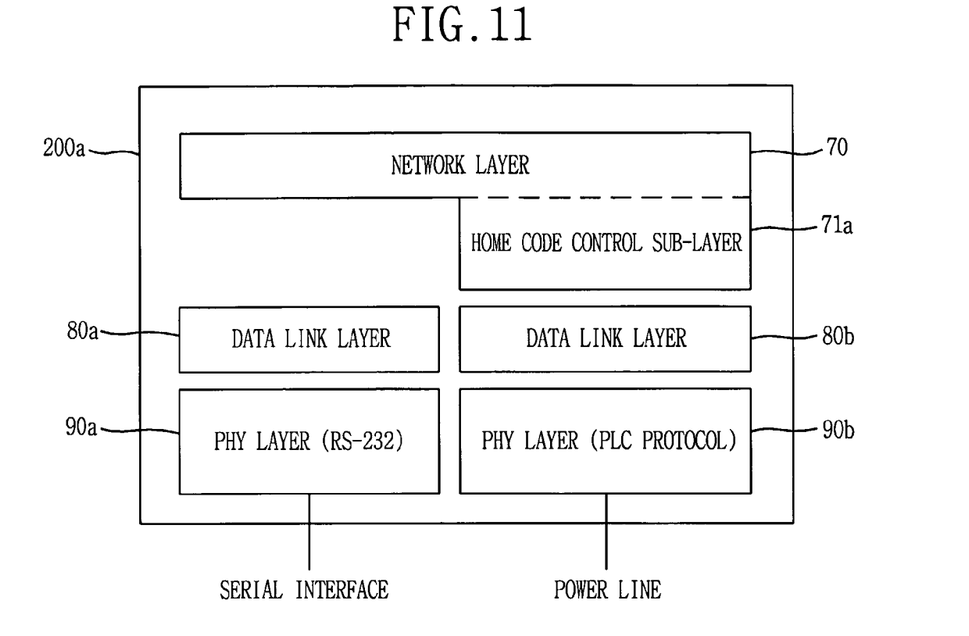
FIGS. 11 and 12 are structure views illustrating layers of an LnCP router, respectively, according to first and second embodiments of the present invention.
Figure 12:
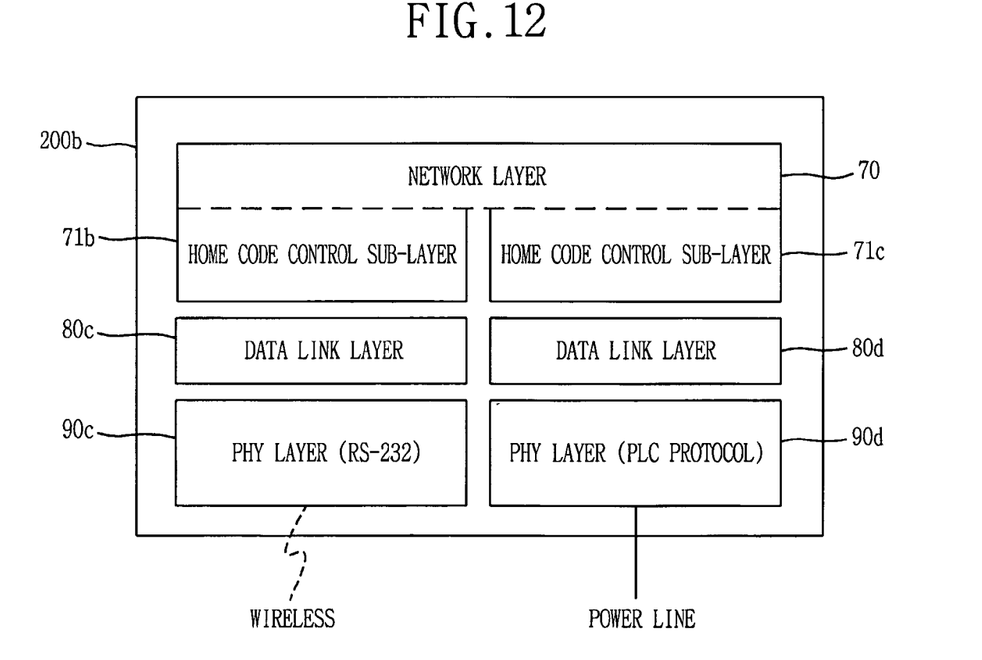

FIGS. 11 and 12 are structure views illustrating layers of an LnCP router, respectively, according to first and second embodiments of the present invention. As described above, the LnCP routers 30 and 31 transmit a packet from one medium to another medium, and the LnCP adapters 35 and 36 access to a dedicated transmission medium as RS-485. And the LnCP routers 30 and 31 and the LnCP adapters 35 and 36 are access units between transmission mediums or between the network manager 22 or the electric device 46 and transmission medium according to the LnCP.

The LnCP routers 30 and 31 and the LnCP adapters 35 and 36 (hereinafter they will be referred to as 'access units') have one of the layer structures 200a and 200b depicted in FIGS. 11 and 12.

An LnCP access unit 30, 31, 35, and 36 having the layer structure 200a of FIG. 11 includes two physical layers 90a and 90b for connection with a network composed of different transmission media (for example, serial interface and power line). Besides the aforementioned power line, the LnCP access unit further includes a wireless protocol as a network using a dependent transmission medium. In addition, the LnCP access unit includes data link layers 80a and 80b corresponding to the physical layers 90a and 90b, respectively, and a network layer 70 for connecting the data link layers 80a and 80b. The structure above the network layer 70 is the same as FIG. 2.

Also, the layer structure 200a further includes a home code control sub-layer 71a for managing a home code for network security, in which the home code control sub-layer 71a is formed between the data link layer 80b connected to a dependent transmission medium (power line) and a network layer 70.

Now referring to FIG. 12, an LnCP access unit 30, 31, 35, and 36 having the layer structure 200b of FIG. 12 includes two physical layers 90c and 90d for connection with a network compose of dependent transmission media (for example, wireless and power line). In addition, the LnCP access unit includes data link layers 80c and 80d corresponding to the physical layers 90c and 90d, respectively, and a network layer 70 for connecting the data link layers 80c and 80d. The structure above the network layer 70 is the same as FIG. 2.

Also, the layer structure 200b further includes a plurality of home code control sub-layers 71b and 71c for managing a home code for network security, in which the home code control sub-layers 71a are formed between the data link layers 80c and 80d connected to a dependent transmission medium (power line) and a network layer 70, respectively. That is, the number of home code control sub-layers 71b and 71c is carefully selected to be in correspondence to the number of dependent transmission media or networks the LnCP access units 30, 31, 35, and 36 access.

Each of the home code control sub-layers 71b and 71c has its own home code, so that security between different dependent transmission media or between different networks can be maintained.

Figure 13:
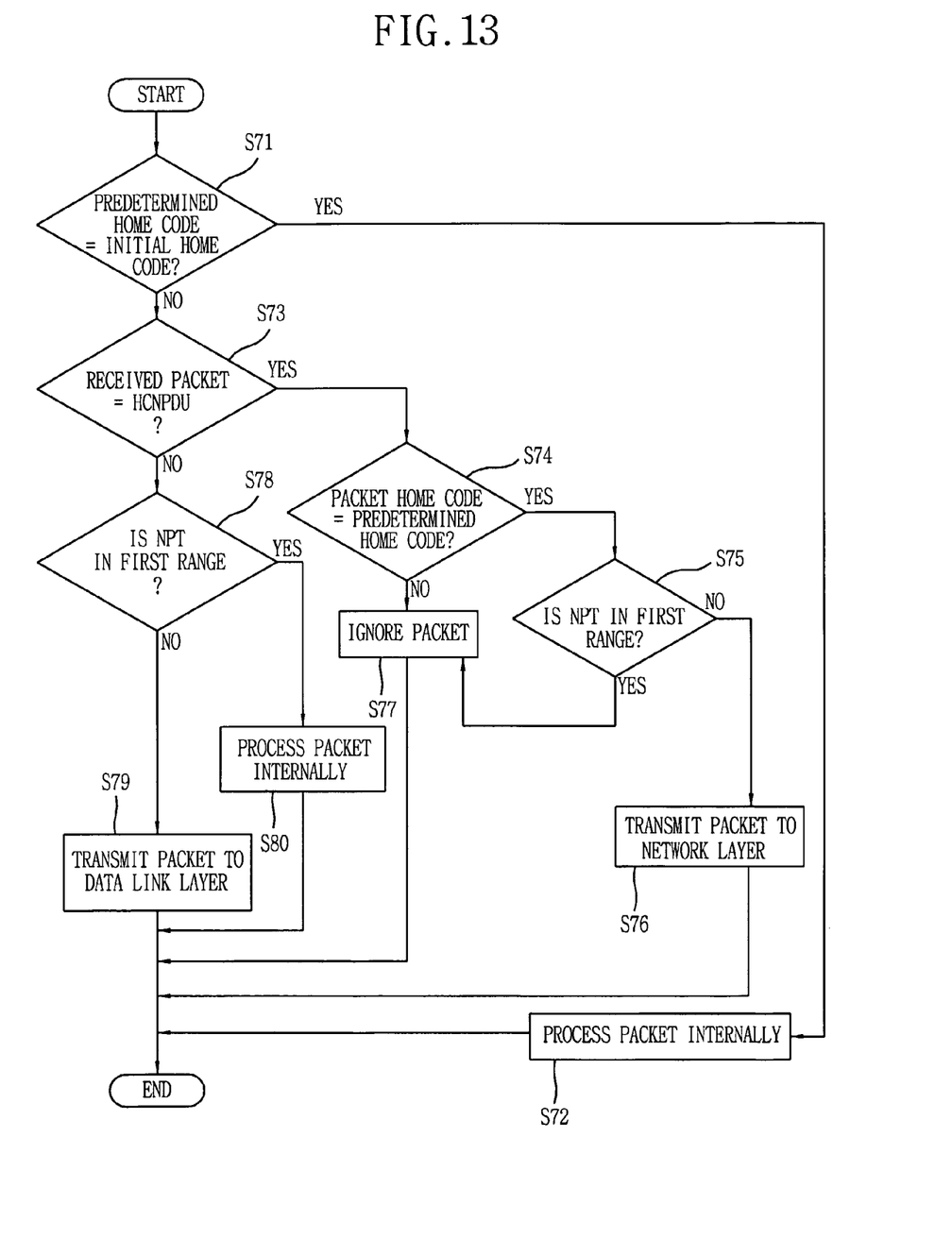
FIG. 13 is a flow chart explaining a packet processing method of a home code control sub-layer in a home network system according to the present invention.

FIG. 13 is a flow chart explaining a packet processing method of a home code control sub-layer in the home network system according to the present invention.

To proceed the packet processing method, the home code control sub-layer 71, 71a, 71b, and 71c (hereinafter collectively called '71') receives an HCNPDU/NPDU from the data link layer 80 or the network layer 70.

In step S71, the home code control sub-layer 71 reads its predetermined home code, and compares the predetermined home code with an initial home code (for example, 0x00000000). When the predetermined home code is the same with the initial home code, the received packet is processed within the home code control sub-layer 71 and the packet processing is completed (S72). Having the predetermined home code equal to the initial home code means that the network manager 20 to 23 and/or the LnCP access units 30, 31, 35, and 36 and/or electric devices 40 to 49 to which the home code control sub-layer 71 is applied made a first access to the home network system 1, so an intrinsic home code (which is not the same as the initial home code) is not yet given. Therefore, steps S71 and S72 are required basically for the user or the home network system 1 to give an intrinsic home code. When the predetermined home code is not the same as the initial home code, the method proceeds to a next step S73.

In step S73, the home code control sub-layer 71 decides whether the received packet is an HCNPDU. In other words, the home code control sub-layer 71 decides whether the received packet is an HCNPDU from the network layer 70, or an NPDU from the data link layer 80. If it turns out that the received packet is the HCNPDU, a next step S74 is performed. Otherwise, a step S78 is performed.

In step S74, the home code control sub-layer 71 compares a home code included in the received packet with the predetermined home code. This comparison is carried out to find out if a device having the home control sub-layer is a destination of the received packet. When the home code included in the packet is the same as the predetermined home code, a step S75 is performed, but if not, a step S77 is performed and the received packet is ignored (i.e., discarded).

In step S75, the home code control sub-layer 71 decides if an NPT field value included in the packet is in a first range from 13 to 15. The first range is set for an interface with the home code control sub-layer 71. For instance, when the NPT field value is in the first range, a step S77 is performed and the packet is ignored. However, when the NPT field value is in a range from 0 to 12, which is not the first range, a step S76 is performed.

In step S76, the home code control sub-layer 71 removes the home code field from the received HCNPDU, and then transmits only the NPDU to the network layer 70.

In step S78, the home code control sub-layer 71 decides whether an NPT field value included in the NPDU transmitted from the network layer 70 is in the first range. When the NPT field value belongs to the first range, a step S80 is performed and the home code control sub-layer 71 processes the received packet internally. Meanwhile, when the NPT field value does not belong to the first range, a step S79 is performed, in which the home code control sub-layer 71 adds a home code field to the received packet to generate an HCNPDU, and transmits the HCNPDU to the data link layer 80.

As discussed earlier, the present invention provides the home network system using the control protocol which is the general communication standard for providing the functions of controlling and monitoring the electric devices in the home network system.

In addition, the present invention provides the home network system using the LnCP as the general communication standard.

Further, the present invention provides the general communication standard applicable to any home network system equipped with networks using different transmission media and/or different dependent transmission media, and the home network system conforming to the general communication standard.

The present invention can be advantageously used for maintaining network security between different transmission media or between different dependent transmission media.

For network security, the present invention transmits/receives and processes a packet by using a home code.

Moreover, the present invention transmits/receives and processes the received packet according to a network layer packet type of the received packet.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A home network system comprising:
an electric device communicating with other device through a network and based on a protocol comprising an application layer, a network layer, a data link layer, and a physical layer,
wherein the network is consisted of a dependent transmission medium, and the protocol further comprises a home code control sub-layer for managing a home code for network security when accessing the dependent transmission medium, the home control sub-layer processing a packet from the data link layer or the network layer,
wherein, if the predetermined home code is the same as an initial home code, the home code control sub-layer processes the packet only internally to give an intrinsic home code, and
wherein, if the predetermined home code is not the same as the initial home code and if the packet is a Home Control sub-layer Protocol Data Unit (HCNPDU) from the data link layer, the home code control sub-layer compares a home code included in the packet with the predetermined home code, and processes the packet according to the comparison, or
if the predetermined home code is not the same as the initial home code and if the packet is a Network layer Protocol Data Unit (NPDU) from the network layer, the home code control sub-layer processes the NPDU according to a Network layer Packet Type (NPT included in the NPDU.

2. The home network system of claim 1, wherein, if the home code included in the HCNPDU is the same as the predetermined home code, the home code control sub-layer processes the HCNPDU according to an NPT (network layer packet type); and if the home code included in the HCNPDU is not the same as the predetermined home code, the home code control sub-layer ignores the packet.

3. The home network system of claim 2, wherein, if the NPT falls in a first predetermined range the home code control sub-layer ignores the HCNPDU whereas if the NPT falls in a second predetermined range the home code control sub-layer generates an NPDU which is a network aver protocol data from the HCNPDU and transmits the NPDU to the network layer.

4. The home network system of claim 1, wherein, if the predetermined home code is not the same as the initial home code and if the packet is the NPDU from the network layer, the home code control sub-layer processes the NPDU, provided that the NPT of the NPDU falls in the first predetermined range, and does not transmit the NPDU to the data link layer; and the home code control sub-layer adds the designated home code to the NPDU, provided that the NPT of the NPDU fall in the second predetermined range, and then transmits the HCNPDU to the data link layer.

5. A packet processing method in an electric device communicating with other device through a network, wherein the electric device is based on a protocol comprising an application layer, a network layer, a data link layer, and a physical layer, wherein the network is consisted of a dependent transmission medium, and the protocol further comprises a home code control sub-layer, and the home code control sub-layer processes the packet processing method comprising the steps of managing a home code, and processing a packet received from the data link layer or the network layer wherein the method comprises the steps of:

performing a first comparison between the predetermined home code and an initial home code;

if, in the first comparison, the predetermined home code is the same as the initial home code, the home code control sub-layer processes the packet only internally; and if, in the first comparison, the predetermined home code is not the same as the initial home code, making a first decision regarding whether the received packet is a a Home Control sub-layer Protocol Data Unit (HCNPDU) from the data link layer;

if, in the first decision, the received packet is an HCN-PDU, in the home code control sub-layer, performing a second comparison between a home code included in the HCNPDU and the predetermined home code and processing the packet according to the second comparison, or if, in the first decision, the received packet is a Network layer Protocol Data Unit (NPDU) from the network layer, processing the NPDU according to a Network layer Packet Type (NPT) included in the NPDU.

6. The method of claim 5, wherein if, in the second comparison, the home code included in the HCNPDU is the same as the predetermined home code, the method further comprises the steps of:

making a second decision regarding whether an NPT (network layer packet type) of the HCNPDU falls in a first range or a second range.

7. The method of claim 6, wherein if, in the second decision, the NPT falls in the first range, the method further comprises the step of:

in the home code control sub-layer, ignoring the HCN-PDU.

8. The method of claim 6, wherein if, in the second decision, the NPT falls in the second range, the method further comprises the step of:

extracting an NPDU from the HCNPDU; and transmitting the NPDU to the network layer.

9. The method of claim 5, wherein if, in the second comparison, the home code included in the HCNPDU is not the same as the predetermined home code, the method further comprises the step of:

ignoring the HCNPDU.

10. The method of claim 5, wherein if, in the first decision, the received packet is an NPDU from the network layer, the method further comprises the step of:

making a third decision regarding whether the NPT of the NPDU falls in the first range or the second range.

11. The method of claim 10, wherein if, in the third decision, the NPT of the NPDU falls in the first range, the method further comprises the step of:

processing the NPDU only internally.

12. The method of claim 10, wherein if, in the third decision, the NPT of the NPDU falls in the second range, the method further comprises the steps of:

adding the predetermined home code to the NPDU and generating an HCNPDU; and transmitting the HCNPDU to the data link layer.

* * * * *